Feb. 2, 1965  F. A. RICHARDSON ET AL  3,168,644
MACHINE FOR SELECTING AND COUNTING SHEETS
Filed May 22, 1961  6 Sheets-Sheet 3

Inventors:
Frank Albert Richardson
Stanley William Middleditch
and
Reginald Leslie Walker
By Baldwin & Wight
Attorneys Feb. 2, 1965  F. A. RICHARDSON ETAL  3,168,644
MACHINE FOR SELECTING AND COUNTING SHEETS
Filed May 22, 1961  6 Sheets-Sheet 4

Inventors:
Frank Albert Richardson,
Stanley William Middleditch
and
Reginald Leslie Walker
By Baldwin & Wight, attorneys Feb. 2, 1965    F. A. RICHARDSON ETAL    3,168,644
MACHINE FOR SELECTING AND COUNTING SHEETS
Filed May 22, 1961    6 Sheets-Sheet 5
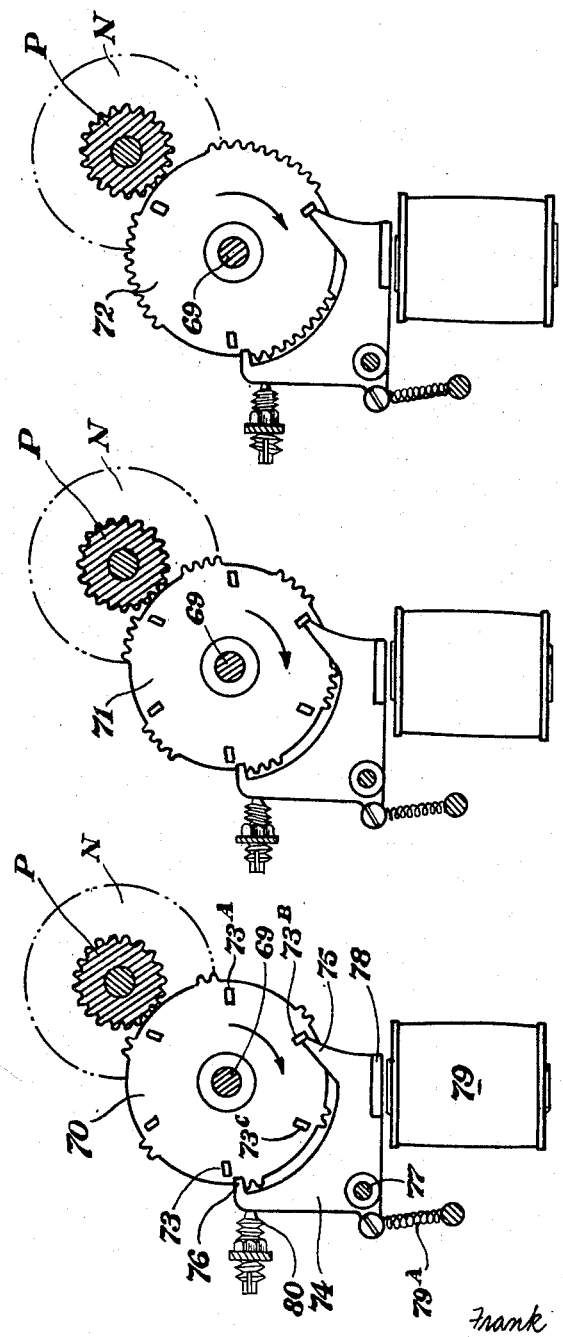

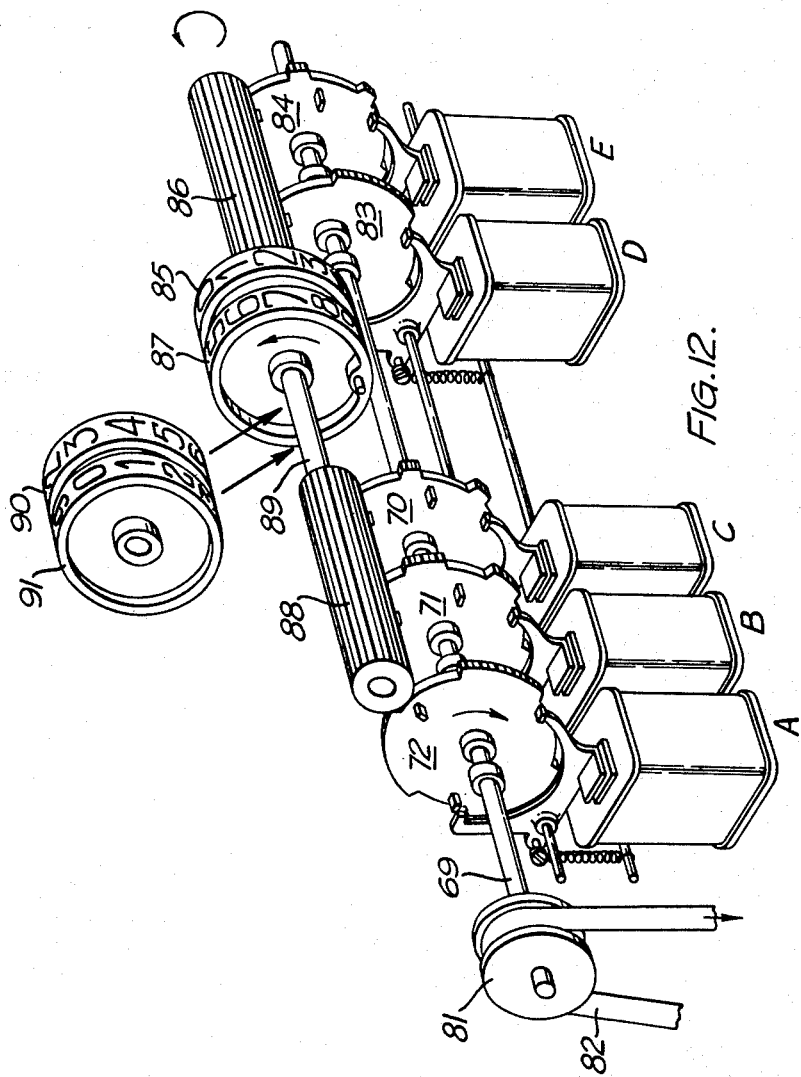

United States Patent Office

3,168,644
Patented Feb. 2, 1965

3,168,644
MACHINE FOR SELECTING AND COUNTING SHEETS
Frank Albert Richardson, Welwyn Garden City, Stanley William Middleditch, Little Heath, Potters Bar, and Reginald Leslie Walker, Wanstead, London, England, assignors to De la Rue Instruments Limited, London, England, a corporation of the United Kingdom
Filed May 22, 1961, Ser. No. 111,635
Claims priority, application Great Britain, June 9, 1960, 20,384/60
6 Claims. (Cl. 235—92)

This invention relates to machines for the high speed handling and counting of sheets of paper and particularly, bank notes, which machines are especially suitable for rapidly and accurately issuing a predetermined quantity of notes for use by bank clerks or for the making up of wage packets for example.

In the co-pending United States patent application of Stanley William Mdidleditch, Serial No. 18,060, filed March 28, 1960, now Patent No. 3,077,983 dated February 19, 1963, there is disclosed a machine designed sequentially to feed a predetermined quantity of sheets or bank notes from a stack on a feed table to a delivery stage, by means of an oscillating suction feeding arm and a roller system. Also incorporated in that machine are means for segregating damaged or multiple thickness notes by means of a detecting or gauging roller system, and diverting such notes into a collection hopper; the control means for the issuing of a predetermined quantity of notes include a dialling system to enable the operator to select any two figure number by means of units and tens dials. The electronic circuiting of the system incorporate digital counters to record the selected quantity dialled and also accumulative counters to show the total number of notes issued by the machine.

The present invention relates to an improved sheet or bank note feeding system so as to enable the machine to provide a composite delivery of notes to be made or alternatively to provide for a rapid change over from one denomination of bank notes to another.

An object of the present invention is to provide mechanism whereby any of a series of feed tables or compartments each containing supplies of different value treasury notes, may be remotely manipulated into a desired operative position for the dispensing of predetermined quantities of notes.

A further object of the invention is to provide interlocking electrical circuitry to permit any selected table or compartment automatically to align with the suction feeding arm of the feeding means of the machine.

A further object of the invention is to provide a totalising system including automatic switching to energise a counter unit relating to the value of the notes being delivered and also an aggregate counter unit arranged to give the total face value of a series of individual issues of same or different value notes.

According to the present invention, a machine for the high speed handling of sheets of paper comprises supporting means for separate stacks of sheets, means for removing sheets one at a time from the stacks, a roller system for receiving and conveying sheets so removed, sheet counting means and control means for selectively positioning any one of the said stacks of sheets into operative position with respect to the sheet removing means, whereby sheets in a selected stack will be removed sequentially therefrom, fed into the roller system and counted.

The invention as stated above is mainly applicable to the counting of bank notes which may have different cash values and in these circumstances the supporting means is divided into compartments each of which supports a stack of bank notes of the same cash value over a desired range of values. In an example three compartments may be provided, one of which supports 10s./– bank notes, another £1 and the third £5 to enable an operator of the machine to dispense a desired value of currency according to a customer's requirements; alternatively five compartments may be provided for dealing with United States of American currency values of $50, $20, $10, $5 and $1 notes.

The compartments containing the respective stacks of sheets may be assembled in a variety of ways so that any one compartment may be manipulated into the operative position in alignment with the feeding means. It is preferable that the sheet supporting assembly is of unitary construction and the compartments may be assembled in tiered, transversely abutting or radial relationship and that the respective manipulating mechanisms will cause the assembly to elevate or descend, side traverse or revolve to position a stack of notes of the desired value.

As already stated, any of the stacks of notes may be moved into the feeding position as desired and it is preferable that a control means is provided to enable the operator to select the desired currency value by means of a suitable switch that in turn will cause the manipulating mechanism automatically to position the respective compartment. It is also preferable that, when the desired compartment has been correctly positioned, electric circuits are simultaneously completed to divert electrical pulses from the counting station to a counter unit appropriate to the particular currency value.

Preferably an aggregate counter is provided to record the total quantity and/or face value of sheets taken from all of the stacks of sheets during a period of the working of the machine.

Preferably also means are provided for gauging or detecting multiple, folded or damaged sheets and diverting same so as to now allow them to pass through the said counting and stacking stages.

An example of the invention will now be described with reference to the following diagrammatic drawings in which:

FIGURES 9, 10 and 11 are end elevations of three types of counting wheels incorporated in FIGURE 12, which is a perspective view of a complete aggregate counter unit.

Figure 1:
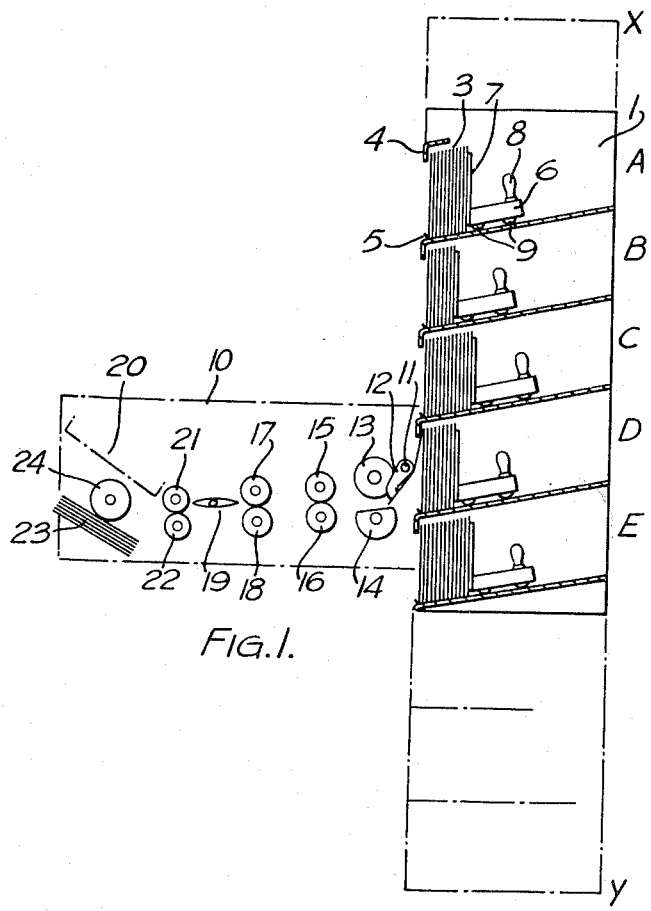
FIGURE 1 shows a side elevation of a multiple feed table in conjunction with a bank note handling and counting machine.

Referring first to FIGURE 1, there is shown a sheet carrier unit in which a framework 1 forms the support for an elevating feed table or movable carriage having individual compartments A, B, C, D and E. For the purpose of the example it will be assumed that these contain bank notes having different classifications or values of $50, $20, $10, $5 and $1 respectively, and in all of the figures the particular piece of mechanism relating to that value will be referred to by the five aforementioned letters. Each of the compartments A–E includes an inclined platform 2 attached to side plates forming the frame work of the unit. A stack of notes 3 is arranged in vertical formation with the foremost note resting against an angled projection 4 at the top and a light spring strip 5 at the bottom, both forming part of the compartment. A sliding carriage is arranged to bear against the rearmost note in the stack to provide a constant thrusting force. This carriage includes a weighted body member 6, a vertical thrust plate 7, an operating handle 8 and a series of rollers or wheels 9 located within grooves formed in the body member, to provide an anti-friction mounting to the assembly. These assemblies are identical. Therefore reference has only been made to one. In the illustration the compartment D, containing the $5 notes, is in the operative position and it will be seen that by elevating or lowering the framework between the limits X and Y any of the five compartments may be aligned with the feeding station.

The note handling and counting section of the machine comprises a unit for removing sheets from a selected one of the compartments A, B, C, D and E, and delivering the removed sheets for collection. The sheet removing and delivery unit includes a pair of main frames, one of which is shown at 10. A transverse shaft 11 rigidly mounts an oscillating suction arm 12 arranged to travel between the face of the foremost note in the feed table and the position as shown. A suction port of the arm 12 is in continuous connection with a source of suction (not shown) and draws off the lower edge of the note and feeds it into a set of primary feed rollers 13 and 14. A cut-away section of the periphery of the lower roller 14 permits entry of the leading edge of the note. These rollers are phased with the movement of the suction arm to position the note prior to the coacting of the rollers, so that the note is pulled off the suction face and passed through the machine to a series of secondary feed rollers 15, 16, 17 and 18. Also incorporated in the primary rollers are means for detecting thicknesses exceeding a predetermined amount thereby to segregate and divert undesirable notes. This detecting means is connected with a diversion means including a deflector plate 19 arranged to divert an imperfect note into a hopper 20. Satisfactory notes are fed by the secondary feed rollers below the deflector plate 19 and between the nip of a pair of counting rollers 21 and 22. One of these rollers is electrically insulated from the frame of the machine and therefore the passing of a note will cause a momentary break in current continuity which is arranged to influence a counting system. Notes are then finally collected at a stacking stage 23 by means of a power driven friction wheel 24. It is so arranged that the pairs of rollers are positively driven at a constant peripheral speed to ensure satisfactory handling of the notes; however, at the stacking stage, the friction wheel 24 may advantageously have a slightly incresaed peripheral speed. The functioning of this section of the machine is fully disclosed in the specification, the aforesaid Patent No. 3,077,983, but brief details are herein included to assist in the clear understanding of this invention.

Figure 2:
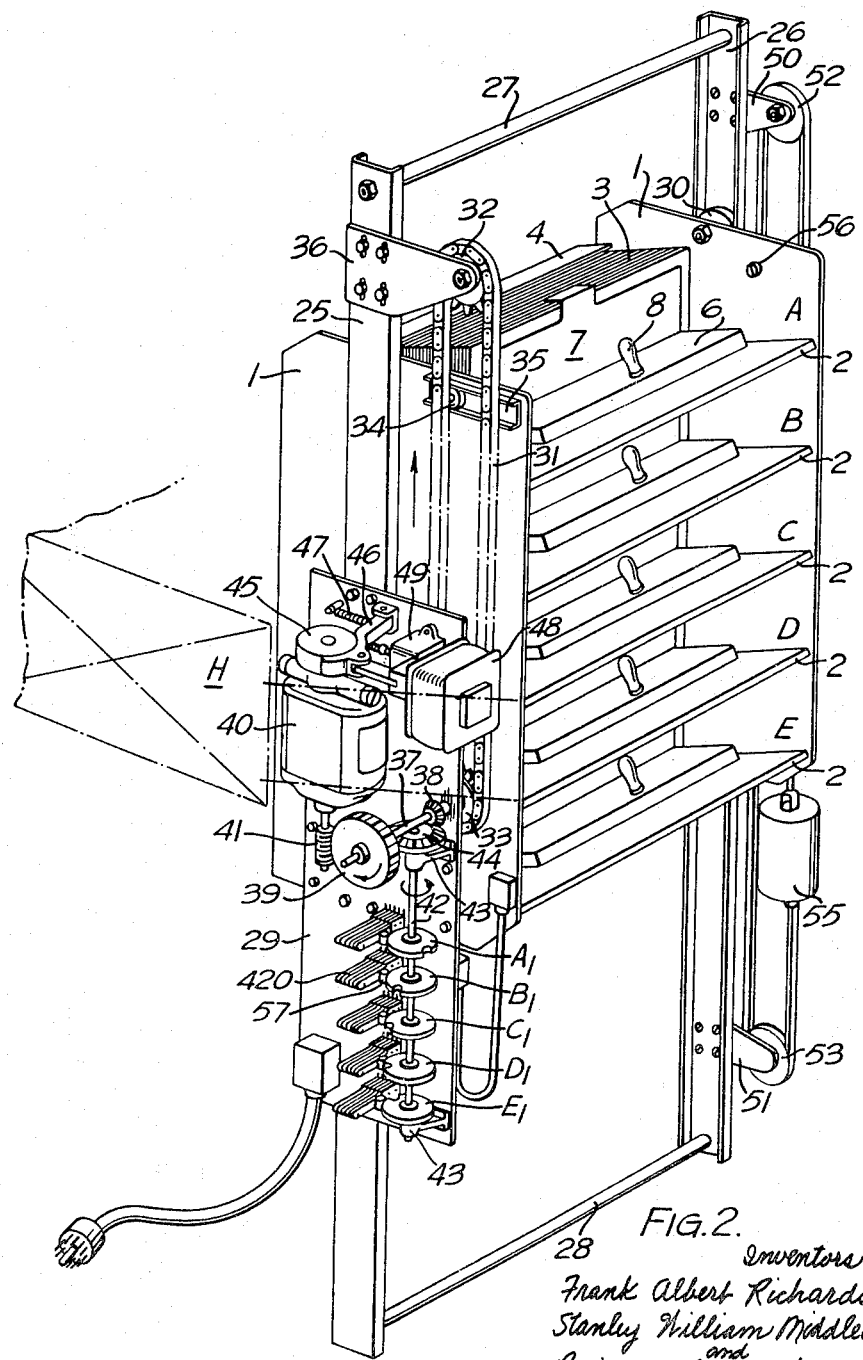
FIGURE 2 is a perspective view showing an elevating multiple feed table together with its associated operating and controlling mechanism.

Referring now to FIGURE 2, there is to be seen a five-compartment multiple feeder unit that may be raised or lowered mechanically to feed into a handling machine shown by symbol H. As in FIGURE 1 the compartment D is in the operative position. A mounting for the elevating mechanism consists of a pair of parallel channel section guide rails 25 and 26, the extremities of which are connected by two tie rods 27 and 28 secured by nuts. A plate 29, forming the mounting for the mechanism, is secured to the left-hand vertical guide rail 25 as shown by means of countersunk screws and nuts. The elevating compartments consist of a pair of parallel plates 1 joined transversely by the five inclined shelves 2 forming the working surfaces of the feed compartments. The forward edges of these shelves are bent downwards to form the stop members 4 (FIGURE 1) for the tops of the notes in the compartment situated below. In the case of the upper compartment A, an additional angle member 4 is required to serve the same function for the top compartment. A stack of notes 3 is shown in position in the compartment A together with the pressure thrusting member as previously described in FIGURE 1. The elevating assembly is arranged to slide vertically by means of four ball races (one only is visible at 30) attached by means of stub axles, and guided between the channel faces of the rails 25 and 26. The assembly is raised or lowered by means of an endless chain 31 carried by an idler sprocket wheel 32 and driven sprocket wheel 33. A further ball race 34 is attached to the chain 31 and is arranged to engage within the parallel faces of a short length of channel section material 35 horizontally mounted on the plate 1. It will thus be seen that by driving the sprocket wheel 33 in a constant direction, the compartments A–E will rise until the ball race 34 assumes the position at the top of the idler sprocket wheel 32 and descends until it reaches the bottom of the driven sprocket 33. The ball race 34 is free to travel along the channel member when required, viz. when the compartments are nearing or leaving the upper and lower extremities. The idler sprocket wheel 32 is mounted on an adjustable bracket 36 attached to the channel member 25 by countersunk bolts and nuts. The lower driven sprocket wheel 33 is rigidly mounted on a horizontal shaft 37, passing through the plate 29, and carrying also in a rigid manner a bevel gear 38 and a worm wheel 39. A suitable bracket and bearing (not shown) are provided to support the free end of the shaft 37. A vertically mounted electric motor 40 is secured to the plate 29 and carries on the lower end of its armature shaft a worm 41 arranged to mesh with the worm wheel 39. To enable the elevating assembly to be stopped in any predetermined position, a control shaft 42 is provided with five cams $A_1$, $B_1$, $C_1$, $D_1$, $E_1$ arranged simultaneously to operate three sets of leaf contacts one of which is shown at 420. This shaft 42 is mounted in two bracket bearings 43 and is driven by means of a bevel gear 44 at its upper end, meshing with the bevel gear 38 on the shaft 37. The ratio of the bevel gears are selected so as to cause one revolution of the control shaft 42 every complete cycle of operation of the elevator. In FIGURE 2 it will be seen that each of the cam profiles $A_1$–$E_1$ is provided with a single depression designed to receive a follower 57 (FIGS. 2 and 5) coacting with the sets of leaf contacts 420. It will be appreciated that the cams may be set to any radial position on the control shaft by means of suitable set screws and when a follower 57 falls into the depression in the cam surface, a pair of leaf contacts within each assembly 420 will open thereby to cut off the current supply to the driving motor and arrest the elevator. Although the gear worm and worm wheel drive is non-reversible so that the elevator cannot run back when the current supply is cut off, it is preferable to incorporate a form of braking system to assist in accurate and consistent positioning at each of the stopping stages. The upper end of the armature shaft of the driving motor 40 carries a fly-wheel 45 with which the periphery of which a brake shoe 46 with a friction lining is arranged to co-act. A tension spring 47 is arranged to connect between the shoe 46 and the frame plate 29 to provide a braking force. The brake is pulled away from the flywheel 45 the whole time the motor is energised by means of a solenoid 48. A connecting link is provided to join between the brake shoe and the armature of the solenoid, and also an adjustable screw is arranged to operate a micro-switch 49 controlling the motor circuit.

As a considerable weight is involved in the elevating compartments, it is preferable that a counter balancing system be provided to reduce the power necessary to operate the apparatus. A pair of brackets 50 and 51, attached to the right hand guide rail 26 by means of countersunk bolts and nuts, form anchorages for a pair of grooved pulley wheels 52 and 53 respectively. A stranded steel cable 54 is arranged to pass over these pulleys and connect to the top and bottom of a weight member 55. A screwed peg 56 mounted to the side frame plate 1 of the compartment framework is attached to the cable as shown so that as the elevator descends the weight ascends and vice versa.

Figure 3:
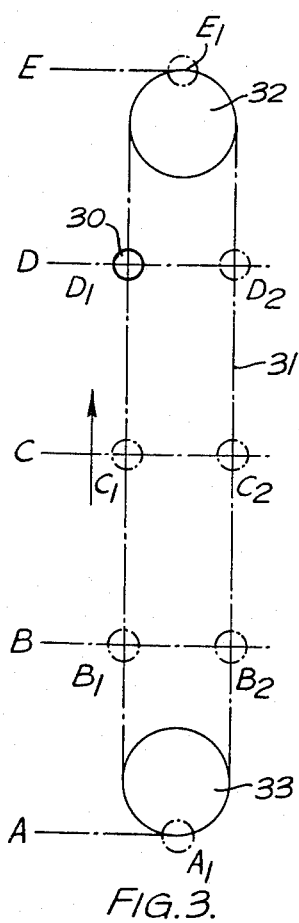
FIGURE 3 is a graphical representation of the phases of the elevating mechanism.

Referring now to the graphical diagrams 3 and 4, FIGURE 3 shows diagrammatically the sprocket wheels 32 and 33, the chain 31 and the ball race 30 in the position as shown in FIGURE 2. The compartment D is in the operative position and the chain will move in the direction of the arrow for the following sequence of operation to E1. It will be apparent that for a complete cycle of operation of the chain, positions D, C and B will be passed two times, via. D1–D2, C1–C2 and B1–B2. It is therefore possible, but perhaps undesirable, for a particular requirement of the machine to stop the elevator at every adjacent increment, or alternatively omit the stages D2, C2 and B2 thereby to pass immediately from E1 to A1. The latter alternative has only been considered in the general description of FIGURE 2.

Figure 4:
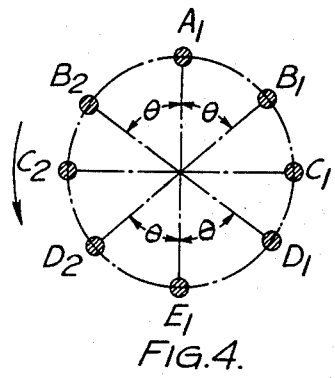
FIGURE 4 shows the identical phases plotted radially.

Referring now to the FIGURE 4 which includes the identical functions of FIGURE 3, but transposed to the form of radial displacement, i.e. the phasing of the control shaft 42. It will be seen that 180° of movement exists between stages A1 and E1 and 90° between the intermediate stages A1, C2, E1 and C1 as position C is midway between A and E. However, for the positions B and D slight radial compensation is necessary to allow for loss of chain length around the sprocket peripheries. Thus in the figure $\theta$ equals 45° plus a small allowance. It is obviously possible to position cams controlling B and D, in any radial location on the control shaft, but, where it is desirable to stop the carriage at each adjacent stage, the cams for B and D must have two depressions at an angle of $2\times\theta$.

Figure 5:
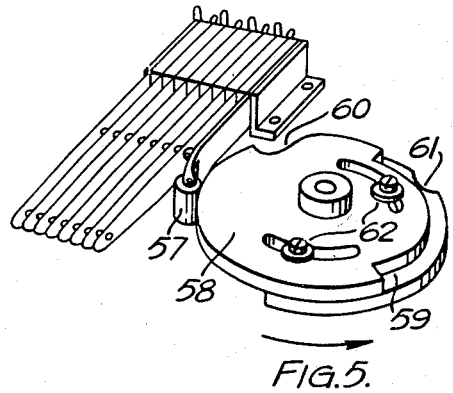
FIGURE 5 is a perspective view of one of the control cams as shown in FIGURE 2.

In FIGURE 5 will be seen a double cam that may be adjusted for both of the depressions to cover the requirements as quoted above. It is so arranged that the cam follower 57 is of sufficient width to span both surfaces of the two sections 58 and 59 of the cam forming a continuous periphery. A depression 60 is formed in the surface of 58 and a similar depression 61 in the surface of 59. The two sections are adjustably secured together by means of slotted holes and screws 62.

Figure 7:
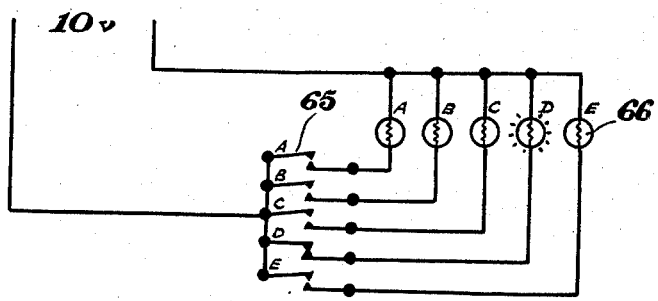
Figure 8:
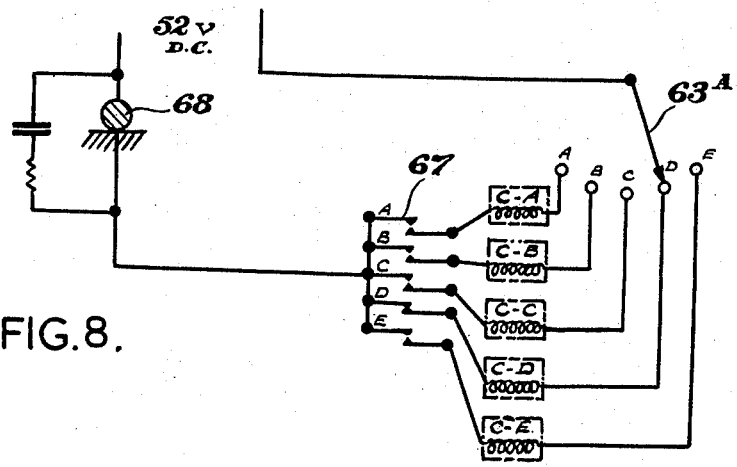

The principal electrical circuits will now be described with reference to FIGURES 6, 7 and 8.

Figure 6:
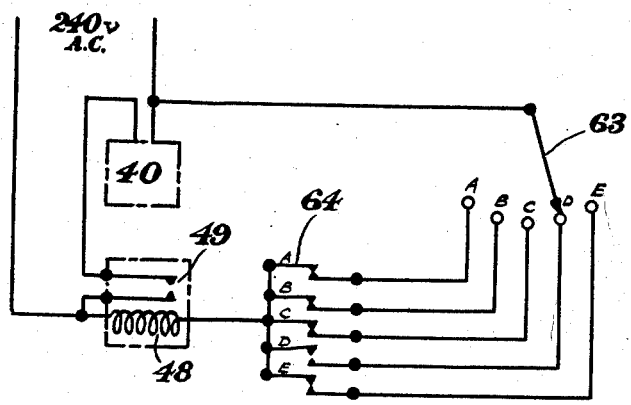
FIGURES 6, 7 and 8 are electrical circuit diagrams of the controlling and counting systems of the machine.

Firstly, FIGURE 6 shows means for arresting the elevator at any of the five predetermined stages. A control selector switch 63 is employed to enable the operator to stop the elevator at the desired compartment. This may comprise a double-bank type rotary switch as shown, or alternatively be of the push-button type wherein any selected button, when depressed, will complete a plurality of circuits. In this instance interlocking mechanism will be required to prevent more than one button being depressed simultaneously. One side of a 240 volt A.C. mains supply is connected to the centre of one bank of the rotary switch 63 and also to the electric motor 40. Symbol 64 represents the first pair of contacts of each of stages A, B, C, D and E controlled by their respective cams. It should be noted that these contacts are normally closed and are opened when the respective follower falls in the appropriate depression. The contacts of 64 are connected together on one side and to the mains supply via the brake solenoid 48; the other side of the contacts lead to the five positions in the selection switch as shown. The motor circuit is completed to the mains via the micro-switch contacts 49. The diagram shows the rotary switch 63 positioned at stage D and the appropriate contacts D of 64 are in the open position. As an example, if the control switch 63 is now turned to stage E, the mains circuit will be completed via the closed contacts E of 64, and thus energise the brake solenoid 48 which will close the contacts of 49, when the brake shoe is released, and thereby start the motor 40. The motor will continue to run until the elevator has moved to the operative position of compartment E; at this time the contacts E of 64 will be opened by the cam and the current supply cut off to apply the brake and also stop the motor.

If the elevating mechanism is arranged to be enclosed within a casing or if the control panel is remote from the machine it is desirable for the operator to be aware of the particular position of the elevator. To enable this to be carried out FIGURE 7 illustrates a low voltage circuit arranged to illuminate one of five pilot lights 66 according to the position of the control shaft 42. Symbol 65 represents the second pair of contacts of each of the stages A, B, C, D and E controlled by their respective cams. In this instance the contacts are normally open and are closed when the cam follower falls into a depression of the cam surface. As illustrated, the elevator is stationed at stage D and the circuit is completed via contacts D of 65 to thereby light the pilot light D66.

Coming now to the circuit controlling the counting units, reference will be made to FIGURE 8. A 52 volt D.C. supply is connected to the second bank of the rotary control switch 63A. Five contacts direct the current flow to counter units each adapted to record individual monetary values of the particular notes being fed through the counting rollers. Symbol 67 represents the third pair of contacts of the stages A, B, C, D and E controlled by the cams and arranged to close when the particular cam follower is in a depression. The contacts are connected on one side to the counters as already stated and the other sides of the contacts are bridged and fed to the frame of the machine and thence to the insulated shaft 68 of the counting roller 21 (FIGURE 1). A condenser and resistor are provided as shown to minimise arcing between the roller surfaces. It will thereby be seen that when the control switch 63A is selected to position D, the contacts D of 67 will also be closed and notes fed between the counting rollers will cause current pulses to advance the counter unit C–D.

As mentioned earlier, five values of currency are assumed to fill the respective compartments, and it is therefore necessary to modify standard 10-increment counters as follows to record monetary totals:

| Compartment | Value $ | Modification |
|---|---|---|
| A | 50 | Units wheel to be fixed at 0. Tens wheel to be calibrated 0-5-0-5 etc., and arranged to advance one increment per pulse. Hundreds wheel to advance one increment per alternate pulse (i.e. starting from 0). |
| B | 20 | Units wheel to be fixed at 0. Tens wheel to be calibrated 0-2-4-6-8 etc., and arranged to advance one increment per pulse. Hundreds wheel to be advanced one increment per ½ revolution of tens wheel (i.e. starting from 0). |
| C | 10 | Units wheel to be fixed at 0. Tens wheel unmodified, and arranged to advance one increment per pulse. Hundreds wheel unmodified. |
| D | 5 | Units wheel to be calibrated 0-5-0-5 etc., and arranged to advance one increment per pulse. Tens wheel to advance one increment per alternate pulse. Hundreds wheel unmodified. |
| E | 1 | Unmodified. |

In addition to the totalisation of sums of money taken from each of the respective compartments it is also desirable to provide an aggregate total of sums of money taken from a plurality of compartments forming a batch of delivered notes. This may be accomplished by electronic means by a counting pulse from the appropriate individual value counter feeding through an electronic multiplier into a single counter unit of the "Dekatron" type capable of receiving high speed impulses.

An alternative mechanical embodiment of an aggregate counter will now be described with reference to FIGURES 9, 10, 11 and 12. Limitations exist in the mechanical speed of operation in the electromagnet type of counter unit arranged to advance a ratchet wheel an increment per pulse thereby to rotate a numeral wheel. Although this type can satisfactorily record single units at a rate of up to 10 cycles per second with complete satisfaction, difficulties exist when similar counters are required to advance up to 5 increments per pulse at the same rate of operation.

The following description relates to a counter unit capable of registering the aggregate total of a plurality of different value inputs at a high speed of operation. In this instance the electromagnets are only required to unlatch an escapement mechanism and an external force performs the function of advancing the numeral wheels. FIGURES 9, 10 and 11 illustrate similar mechanisms capable of feeding in to a common input, increments of 1, 2 or 5. A driving shaft 69 is driven through a belt system from a suitable take-off point from the gear train of the counting machine drive at a speed slightly in excess of one third of the speed of the required delivery speed of the machine. Therefore in the example where a speed of 10 notes per second is desired a rotational speed of 240–250 r.p.m. will suffice. Gear wheels 70, 71 and 72 are mounted on the shaft 69 in slipping relationship. This is achieved by mounting the freely running gear wheels between fixed collars on the shaft incorporating coil spring end thrust to provide the desired degree of friction. Mounted in the side faces of the gear wheels are a number of stop pegs 73; in the cases of gears 70 and 71 six are provided and in the case of 72 only three. These pegs form the pallet in an escapement system, and therefore the number of pegs will determine the radial displacement of the gear per cycle. The escapement for each of the three mechanisms consists of a bell-crank 74 having stop pawls 75 and 76, and pivoted about a bearing 77. The lower arm of the bell-crank includes a right angled projection forming an armature 78 capable of being attracted to an electro-magnet 79 when energised. A return spring 79A and an adjustable stop member 80 are provided to control the movement of the escapement. In the static position as shown in FIGURE 9 the stop 75 is in engagement with the stop peg 73B and when the electro-magnet 79 is energised, it will allow the gear wheel 70 to turn until the peg 73C contacts the stop pawl 76. Finally, when the magnet is de-energised, the pawl 76 will withdraw from 73C and 75 will prevent further rotation by arresting the peg 73A. This procedure will be carried out for each pulse of current supplied to the magnet, and the gear will accordingly rotate through 60°.

It will be noticed that the gear wheels have different numbers of teeth set at intervals followed by a plain section. The interval between these teeth corresponds to the number of the stop pegs contained on the particular wheel, and the number of teeth is directly proportional to the degree of motion it is desired to transmit to a common take-up pinion P rigidly mounting a numeral wheel N. The depth of mesh and tooth profile is important to ensure that the requisite movement is imparted, for example the take-up pinion P as shown has twenty teeth and the passing of two teeth in FIGURE 9 will advance pinion P through $\frac{1}{10}$ of a revolution (i.e. one unit on the numeral wheel N). Similarly four teeth of gear 71 in FIGURE 10, and ten teeth in FIGURE 11 will cause advancements of 2 and 5 numerals respectively. It should be noted that pinion P is free to turn between the gaps formed by the groups of teeth.

A complete counter will now be described with reference to FIGURE 12.

A pulley 81 and driving belt 82 provide motive power through the shaft 69 and slipping clutches to the five gear wheels in the manner as already described.

A "units" numeral wheel 85 is rigidly mounted with a take-up pinion 86 immediately below which respectively are mounted escapement assemblies D and E having gear wheels with teeth groupings of 10 and 2 which are thereby capable of recording values of 5 and 1 per pulse of the respective magnet. In a similar manner the "tens" numeral wheel 87 is integrally mounted with the pinion 88, but in this instance a tubular connecting piece 89 is provided to form journal surfaces for the "hundreds" and "thousands" wheels illustrated at 90 and 91.

Immediately below the tens pinion 88 are three escapement assemblies having gear wheels 70, 71 and 72 as already described, capable of advancing the numerical totals through 10, 20 and 50 for each pulse from the respective magnets of C, D and E. Mechanisms (not shown) are provided linking the adjacent numeral wheels 85, 87, 90 and 91 to carry the appropriate number to the higher value after reaching 9 as in standard counter practice.

An alternative method of aggregate counting may comprise a set of escapement wheels similar to 84, 83, 70, 71 and 72, each of which are provided with 1, 5, 10, 20 and 50 projections or pole pieces between arresting positions and arranged to influence a transducer which in turn feeds resulting pulses to an electronic counter. It may be preferable, for checking purposes, to include an additional counter unit with each of the solenoid circuits of A, B, C, D and E simultaneously to record the quantity of notes delivered to the counting stage from each of the respective compartments.

Various alternative embodiments may be incorporated into the control system of the apparatus, for instance a large quantity may be "dialled" and the resulting number of the highest value notes delivered until the smallest remainder results. A relay system may then become operative to move the elevator to the next lower value note and then proceed to issue notes of that value until the monetary total has been still further reduced; the procedure may be carried on until the dialled number has been reduced to zero.

What we claim is:

1. In a machine for the high speed handling of paper sheets, such as bank notes, the combination of a single sheet removing and delivering unit comprising means for removing sheets one by one from a stack of sheets presented thereto, and a roller system for receiving and conveying sheets so removed; a sheet carrier unit comprising a carriage including a plurality of separate compartments for respectively supporting a plurality of separate stacks of sheets of different classifications, and means mounting said carriage for movement; operating means for moving said carriage to present selected individual ones of said compartments to said sheet removing means; means for controlling the operation of said operating means to effect positioning of a selected compartment for sequential removal and feeding of sheets therefrom; counting means comprising a plurality of counters corresponding respectively to said compartments; separate electric circuits for respectively individually energizing said counters; and means controlled by said controlling means and responsive to passage of single sheets for selectively closing said electric circuits one at a time to energize the counter appropriate to the compartment selected for presentation of the stack of sheets therein to said sheet removing means.

2. A combination according to claim 1 adapted to handle sheets representing different numerical values, for example bank notes of differing denominations, each compartment being designated to hold a stack of sheets of the same denomination, and wherein each of said counters counts the number of sheets removed from the operatively associated compartment; said combination further comprising a single totalizing counter, and means operatively associated with the separate counters for so actuating the totalizing counter that the latter sums the numerical values of the sheets counted by the several separate counters and presents the total numerical value so summed in digital form.

3. A combination according to claim 2 in which the means for actuating the totalizing counter includes, in operative association with each of the separate counters, an electromagnet, an escapement operated thereby, an escapement wheel having a plurality of pallets and a corresponding number of toothed sectors thereon, having equal numbers of teeth, said toothed sectors being separated by equal gaps; the totalizer counter further including a continuously driven shaft on which said escapement wheels are mounted, frictional couplings between said shaft and each of said escapement wheels, at least one toothed pinion meshing with the toothed sectors of at least two of said escapement wheels, the last named escapement wheels having different numbers of teeth, and at least one counter wheel driven by said pinion.

4. In a machine for the high speed handling of paper sheets, such as bank notes, the combination of a single sheet removing and delivering unit comprising means for removing sheets one by one from a stack of sheets presented thereto, and a roller system for receiving and conveying sheets so removed; a sheet carrier unit comprising a carriage including a plurality of separate compartments for respectively supporting a plurality of separate stacks of sheets of different classifications, and means mounting said carriage for movement; operating means for moving said carriage to present selected individual ones of said compartments to said sheet removing means; means for controlling the operation of said operating means to effect positioning of a selected compartment for sequential removal and feeding of sheets therefrom; counting means comprising a plurality of counters corresponding respectively to said compartments; separate electric circuits for respectively individually energizing said counters; conductive elements normally in electrical contact, except when a paper sheet passes between them; and means controlled by said controlling means for selectively closing said electric circuits one at a time to energize the counter appropriate to the compartment selected for presentation of the stack of sheets therein to said receiving means, said separate electric circuits being connected in parallel to a single circuit in which said conductive elements are connected in series.

5. In a machine for the high speed handling of paper sheets, such as bank notes, the combination of a single sheet removing and delivering unit comprising means for removing sheets one by one from a stack of sheets presented thereto, and a roller system for receiving and conveying sheets so removed; a sheet carrier unit comprising a carriage including a plurality of separate compartments for respectively supporting a plurality of separate stacks of sheets of different classifications, and a fixed frame on which said carriage is supported for movement; operating means including a motor and a train of gearing mounted on said frame for moving said carriage to present selected individual ones of said compartments to said sheet removing means, a shaft driven by said gearing, a plurality of cams mounted on said shaft and corresponding respectively to the different compartments on said carriage, and a plurality of electrical switch means respectively actuated by said cams, each switch means having at least one pair of contacts; electrical circuits respectively controlled by each said pair of contacts; a plurality of sheet counter means each separately energizable by one of said circuits; a single conductor line to which all the said circuits are connected in parallel; means responsive to the passage of single sheets operable to interrupt said single conductor line; and a manually operable selector switch for selectively connecting said circuits one at a time to a source of electrical supply.

6. A combination according to claim 5 further including an electrical circuit controlling the motor, said circuit having a number of parallel branches closable by said manually operable selector switch.

References Cited by the Examiner
UNITED STATES PATENTS

| | | | |
|---|---|---|---|
| 1,328,263 | 1/20 | Buckley and Lard | 235—92 |
| 1,803,624 | 5/31 | Lard | 235—92 |
| 1,839,973 | 1/32 | Lard | 235—92 |
| 2,004,835 | 6/35 | Schneider | 271—57 |
| 2,133,259 | 10/38 | Wolff | 270—2 |
| 2,271,394 | 1/42 | Hayes | 235—92 |
| 2,425,318 | 8/47 | Hayes | 235—92 |
| 2,530,057 | 11/50 | Hayes | 235—92 |
| 2,802,626 | 8/57 | Hayes | 235—92 |
| 2,918,656 | 12/59 | Nolde et al. | 340—174.1 |
| 2,965,291 | 12/60 | Hayes et al. | 235—61.7 |

MALCOLM A. MORRISON, *Primary Examiner.*

WALTER W. BURNS, JR., *Examiner.*